United States Patent
Berg et al.

(10) Patent No.: US 11,411,606 B2
(45) Date of Patent: Aug. 9, 2022

(54) METHOD AND SYSTEM FOR ESTIMATING CROSSTALK BETWEEN ELECTRICAL TRANSMISSION LINES

(71) Applicant: Telefonaktiebolaget LM Ericsson (publ), Stockholm (SE)

(72) Inventors: Miguel Berg, Sollentuna (SE); Daniel Cederholm, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 965 days.

(21) Appl. No.: 16/083,121

(22) PCT Filed: Mar. 24, 2016

(86) PCT No.: PCT/SE2016/050255
§ 371 (c)(1),
(2) Date: Sep. 7, 2018

(87) PCT Pub. No.: WO2017/164788
PCT Pub. Date: Sep. 28, 2017

(65) Prior Publication Data
US 2019/0097682 A1   Mar. 28, 2019

(51) Int. Cl.
*H04B 3/487* (2015.01)
*H04M 3/30* (2006.01)
(Continued)

(52) U.S. Cl.
CPC ............ *H04B 3/487* (2015.01); *H04B 3/466* (2013.01); *H04M 3/304* (2013.01); *H04M 3/34* (2013.01)

(58) Field of Classification Search
CPC ....... H04B 3/487; H04B 3/466; H04M 3/304; H04M 3/34
See application file for complete search history.

(56) References Cited

U.S. PATENT DOCUMENTS

| 5,698,985 A | 12/1997 | Bottman |
| 7,017,130 B2 * | 3/2006 | Lee ........................ G06F 30/367 |
| | | 716/115 |

(Continued)

FOREIGN PATENT DOCUMENTS

| EP | 1998465 A1 | 12/2008 |
| EP | 2787653 A1 | 10/2014 |

OTHER PUBLICATIONS

Author Unknown, "Series G: Transmission Systems and Media, Digital Systems and Networks: Digital sections and digital line system—Access networks: Single-ended line testing for digital subscriber lines (DSL)," Telecommunication Standardization Sector of ITU (ITU-T), Recommendation ITU-T G.996.2, May 2009, International Telecommunication Union, 46 pages.

(Continued)

*Primary Examiner* — Lisa Hashem
(74) *Attorney, Agent, or Firm* — Sage Patent Group

(57) ABSTRACT

Disclosed is a technique for estimating crosstalk between a first and second electrical transmission lines. The method comprises obtaining measurements of a received near end crosstalk, NEXT, signal, the NEXT signal being received at a first end of the second transmission line over a time period as a result of an electrical signal sent onto the first transmission line from its first end, the obtained measurements being in the time domain. Subsequently, a crosstalk coupling estimate is obtained per transmission line sub-interval by compensating the obtained measurements in the time domain of the received NEXT signal for round-trip attenuation of the sent signal from the first end of the first line to the sub-interval and back to the first end of the second line, and an estimate of a total crosstalk coupling is obtained by adding together at least some of the obtained crosstalk coupling estimates per transmission line sub-interval.

21 Claims, 10 Drawing Sheets

(51) Int. Cl.
*H04M 3/34* (2006.01)
*H04B 3/466* (2015.01)

(56) References Cited

U.S. PATENT DOCUMENTS

| | | | | |
|---|---|---|---|---|
| 7,295,018 | B2 | 11/2007 | Oakley | |
| 7,769,100 | B2* | 8/2010 | Cheong | H04B 3/32 |
| | | | | 375/285 |
| 7,809,070 | B2* | 10/2010 | Ashikhmin | H04B 3/487 |
| | | | | 375/260 |
| 8,218,419 | B2* | 7/2012 | Kramer | H04L 25/0244 |
| | | | | 379/1.01 |
| 8,243,578 | B2* | 8/2012 | Kramer | H04L 25/0224 |
| | | | | 379/406.01 |
| 8,332,172 | B2* | 12/2012 | Agoston | H04L 1/205 |
| | | | | 702/69 |
| 2010/0202281 | A1* | 8/2010 | Kramer | H04L 25/0244 |
| | | | | 370/201 |
| 2012/0082258 | A1* | 4/2012 | Nuzman | H04M 3/18 |
| | | | | 375/285 |
| 2014/0153629 | A1* | 6/2014 | Gao | H04B 3/487 |
| | | | | 375/227 |
| 2015/0350415 | A1* | 12/2015 | Nuzman | H04M 3/34 |
| | | | | 379/406.01 |
| 2016/0226556 | A1* | 8/2016 | Nuzman | H04B 3/32 |
| 2016/0286037 | A1* | 9/2016 | Emad | H04M 3/34 |
| 2019/0104036 | A1* | 4/2019 | Zhang | H04L 43/028 |
| 2020/0067568 | A1* | 2/2020 | Spirkl | H04B 1/0475 |

OTHER PUBLICATIONS

International Search Report and Written Opinion for International Patent Application No. PCT/SE2016/050255, dated Nov. 23, 2016, 9 pages.

* cited by examiner

METHOD AND SYSTEM FOR ESTIMATING CROSSTALK BETWEEN ELECTRICAL TRANSMISSION LINES

This application is a 35 U.S.C. § 371 national phase filing of International Application No. PCT/SE2016/050255, filed Mar. 24, 2016, the disclosure of which is incorporated herein by reference in its entirety.

TECHNICAL FIELD

The present disclosure relates generally to a method and a system for estimating crosstalk between a first electrical transmission line and a second electrical transmission line.

BACKGROUND

Even with the massive roll out of optical fiber connections over the last decade, electrical transmission line, e.g. copper, infrastructure is still a crucial part of today's telecommunication networks. In order to decrease the deployment cost and shorten time-to-market, deep-fiber deployments often end with a last drop of metallic cables utilizing standards like Very high rate Digital Subscriber Line 2, VDSL2, and G.Fast. Copper cables such as Category, Cat 5, 6, 7 etc. are also attractive for indoor deployments of Local Area Networks and fronthaul/backhaul of indoor small cells due to their robustness, ease of installation, low cost and the fact that they also can be used for remote powering of the connected equipment.

Line Diagnostic tools that determine the quality of an electrical transmission line, e.g. cable, are important in several steps of the infrastructure life cycle. During pre-deployment, the cable installations should be verified against the communication system requirements. During operation, the performance should be monitored for early detection of degradations. Further, after a fault event, the diagnostic tools should provide guidance to the technician.

For pre-deployment testing and troubleshooting, dedicated cable certifiers could be used. These are however often expensive and they require service personnel at the site connecting the measurement equipment to the cables that should be tested. Therefore, it is often preferred to utilize diagnostic tools that are built in to the telecommunication equipment and that can be executed remotely. Examples of such tools are Single-Ended Line Test, SELT, and Dual-Ended Line Test, DELT, e.g. as specified in G.996.2 for xDSL systems. Proprietary implementations of similar tools are often also included in Ethernet transceivers. Some of the tools perform measurements utilizing nodes at both ends of the line, cf. DELT, while some equipment only implements tools that can perform measurements from one of the nodes, cf. SELT.

One common property of a cable is how much crosstalk that will occur when sending signals. FIG. 1 illustrates near-end crosstalk, NEXT, and far end crosstalk, FEXT, between a first cable pair, pair 1, and a second cable pair, pair 2. NEXT is the received leakage at an end 52 of one cable pair 2, from a signal transmitted on another cable pair 1, from that same cable end 51. FEXT is the received leakage at an end 54 of one cable pair 2, from a signal transmitted on another cable pair 1, from the opposite cable end 51. The received FEXT is typically weaker than the received NEXT since FEXT is attenuated along a direct channel, DC. The direct channel, DC, is a transmission along one cable pair 1, from a first end 51 to the opposite end 53 of the same cable pair. However, in Frequency Division Duplexing, FDD, systems, the NEXT is typically not a problem since the uplink frequency band is separated from the downlink frequency band. FEXT will however degrade the performance of the communication in the victim pair, i.e. degrade performance in pair 2 when influenced by FEXT from pair 1. Therefore, a specification of the communication system might have defined requirements for maximum FEXT that the cable must fulfil. The requirements are often defined as Attenuation to Crosstalk Ratio, Far-end, ACRF, i.e. the FEXT divided with the attenuation, in linear scale.

Measurements of FEXT typically require a dual-ended measurement. A single ended measurement can typically measure NEXT accurately but without a measurement involving the far-end device it is not possible to measure FEXT. Thus it is hard to verify that the FEXT requirement has been met if only a SELT measurement device is available.

Another issue is to identify the source of error if the FEXT performance is not met. A typical cause of bad FEXT performance is that the cable shielding is poor or not existing or that the cable balance is poor. A cable certifier can typically measure both the balance and the shield connection but this is done through common mode measurements. Measurement applications built in communication transceivers can often only perform differential mode measurements and then it is not possible to directly measure the cable balance and shielding.

In case bad FEXT performance is not caused by poor balance and/or shielding, it is preferred to identify where along the cable the worst crosstalk is leaking. Often single point leakage is caused by a metallic fault such as e.g. a short circuit. Another source of FEXT could be that twisted-pairs are untwisted too far when connectors are mounted.

SUMMARY

It is an object of the invention to address at least some of the problems and issues outlined above. It is an object of at least some embodiments to facilitate single-ended measurement of FEXT between two electrical transmission lines. It is possible to achieve these objects and others by using a method and an apparatus as defined in the attached independent claims.

According to one aspect, a method is provided performed by a system for estimating crosstalk between a first electrical transmission line and a second electrical transmission line. The method comprises obtaining measurements of a received NEXT signal, the NEXT signal being received at a first end of the second transmission line over a time period as a result of an electrical signal sent onto the first transmission line from its first end, the obtained measurements being in the time domain. The method further comprises obtaining a crosstalk coupling estimate per transmission line sub-interval by compensating the obtained measurements in the time domain of the received NEXT signal for round-trip attenuation of the sent signal from the first end of the first line to the sub-interval and back to the first end of the second line. The method further comprises obtaining an estimate of a total crosstalk coupling by adding together at least some of the obtained crosstalk coupling estimates per transmission line sub-interval.

According to another aspect, a system is provided configured for estimating crosstalk between a first electrical transmission line and a second electrical transmission line. The system comprises a processor and a memory. The memory contains instructions executable by said processor, whereby the system is operative for obtaining measurements of a received near end crosstalk, NEXT, signal, the NEXT signal being received at a first end of the second transmission line over a time period as a result of an electrical signal sent onto the first transmission line from its first end, the obtained measurements being in the time domain. The system is further operative for obtaining a crosstalk coupling estimate per transmission line sub-interval by compensating the obtained measurements in the time domain of the received NEXT signal for round-trip attenuation of the sent signal from the first end of the first line to the sub-interval and back to the first end of the second line, and obtaining an estimate of a total crosstalk coupling by adding together at least some of the obtained crosstalk coupling estimates per transmission line sub-interval.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, an embodiment is provided that allows estimation of FEXT from a NEXT measurement. Thereby it is possible to verify performance of FEXT without the need of a DELT measurement. NEXT is measured at a first end of a second transmission line, the NEXT originating from a signal sent from a nearby first end of a first line. The NEXT measurement is obtained in time-domain over a certain time so that NEXT measurements from a substantial part of the transmission lines are received, or at least a part of the lines. The time-domain data is then divided into sub-intervals corresponding to sub-lengths of the first and second line. The first and second line may be comprised in a cable. The time-domain data, i.e. the crosstalk, per sub-interval is then compensated for attenuation along the cable. The time-domain data may also be compensated for the roundtrip delay in the NEXT measurement so as to compensate for a phase shift along the cable. The compensated attenuation for each sub-interval may be an average attenuation for the sub-interval. The attenuation-compensated time-domain data for the different sub-intervals are then summed over the whole cable, or at least a part of the cable. Since crosstalk per length unit (sub-interval) is symmetrical, the ACRF can be estimated from the summation of the data. The data summation can then be compared to a threshold to estimate if the FEXT performance is adequate or not. If the FEXT performance is not good enough, i.e. not fulfilling a performance threshold, a continued analysis may be performed in which the distribution of the crosstalk over the cable is exploited. If the crosstalk is rather evenly distributed, it is considered that the reason for the cable not fulling the performance threshold is caused by poor balance and/or poor or missing shield. If the crosstalk is unevenly distributed, for example mainly at one or few locations, it is considered that there are cable faults at the specific locations.

Figure 1:
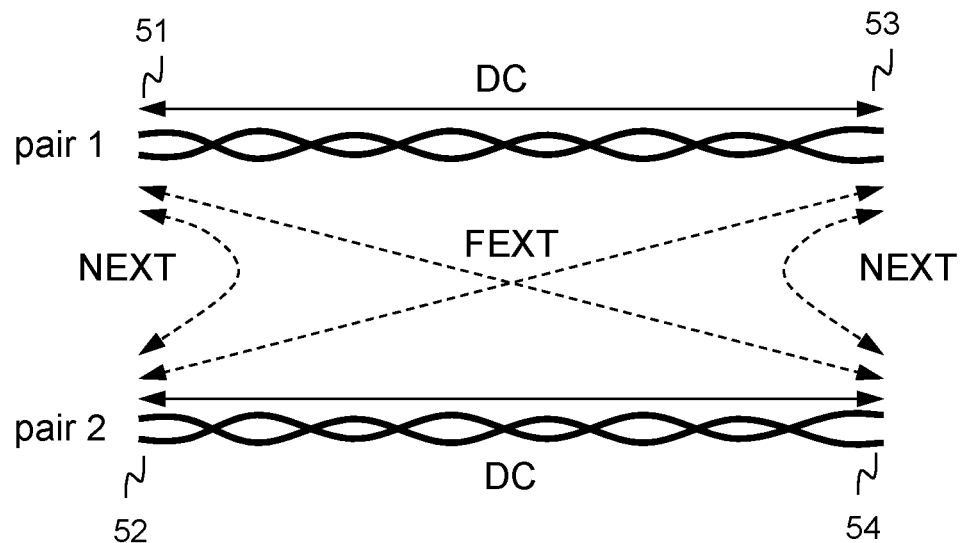
FIG. 1 is a schematic diagram illustrating NEXT and FEXT between two adjacent cable pairs.
Figure 2:
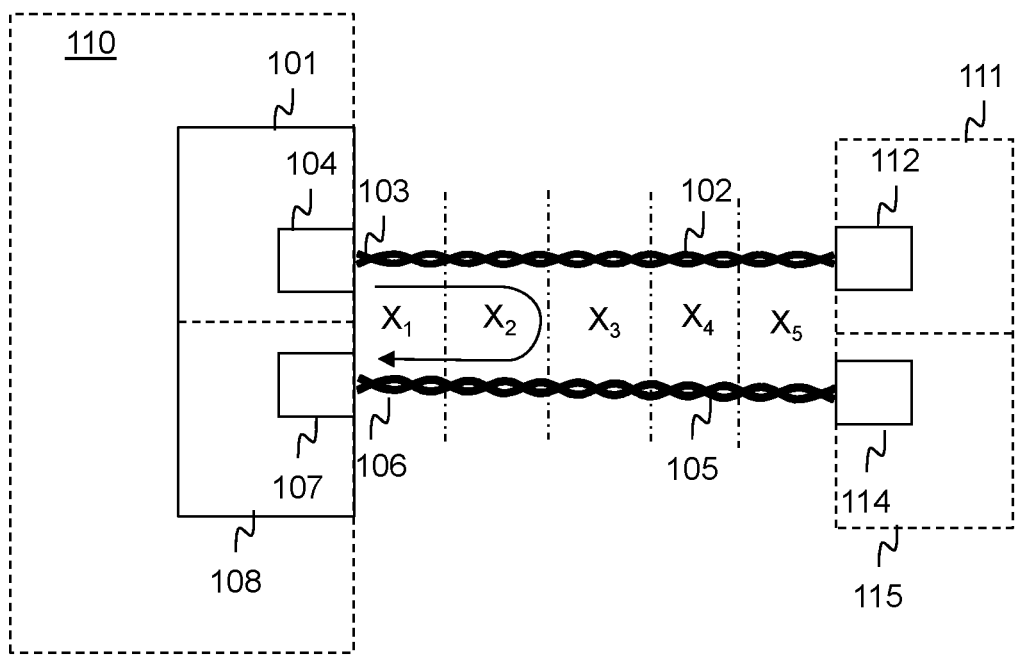
FIG. 2 is a schematic block diagram of a system according to possible embodiments.

FIG. 2 describes a system for measuring crosstalk between a first electrical transmission line 102 and a second electrical transmission line 105. The transmission lines are illustrated as paired transmission lines, however they may as well be single transmission lines. The transmission lines may be arranged in the same cable or as separate cables. A first end 103 of the first transmission line 102 is connected to a transmitter 104 that is arranged to transmit a signal onto the first transmission line. A first end 106 of the second transmission line 105 is connected to a receiver 107 that is arranged to receive a NEXT signal as a result of the signal sent onto the first transmission line and crosstalk occurring between the two transmission lines. The transmitter may be arranged in a first communication node 101 and the receiver may be arranged in a second communication node 108, which nodes may be a part of a communication system 110 that in its turn may comprise more nodes than the first node. The first node may further comprise a receiver for receiving signals on the first line and the second node may further comprise a transmitter for transmitting signals on the second line. The first 101 and the second 108 communication node may be the same node or separate nodes, illustrated by the dashed line separating the first and the second node. The first and the second communication node may be connected to other nodes of the communication system. The communication system 110 may further comprise a third node 111 connected to a second end of the first line 102, opposite the first end 103 as well as a fourth node 115 connected to a second end of the second line 105, opposite the first end 106. The third node 111 may comprise a receiver/transmitter 112 for receiving and/or transmitting signals on the first line. The fourth node 115 may comprise a receiver/transmitter 114 for receiving and/or transmitting signals on the second line. FIG. 2 also illustrates exemplary sub-intervals $X_1$, $X_2$, $X_3$, $X_4$, $X_5$ of the transmission lines. The sub-intervals are divided by the dot-dashed lines. The bent arrow illustrates the travelling direction of a NEXT signal from the first end of the first line 102 via crosstalk over to the second line 105 and back to the first end of the second line. Crosstalk may occur continuously over the extension of the transmission lines. The bent arrow illustrates crosstalk occurring in sub-interval $X_2$.

Figure 3:
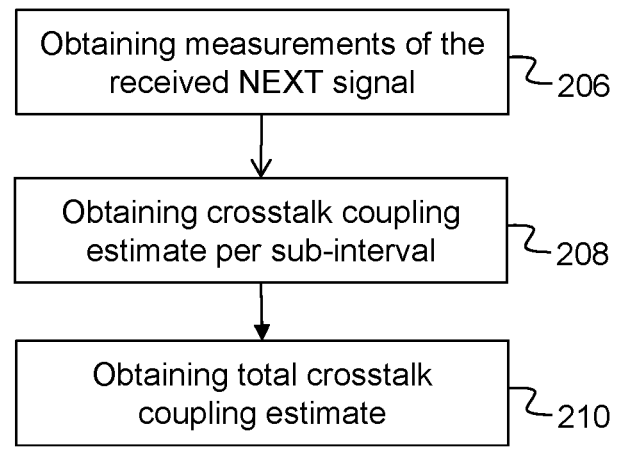
FIG. 3 is a flow chart illustrating a method performed by a system, according to possible embodiments.

FIG. 3 in conjunction with FIG. 2 describe a method performed by a system 110 for estimating crosstalk between a first electrical transmission line 102 and a second electrical transmission line 105. The method comprises obtaining 206 measurements of a received near end crosstalk, NEXT, signal, the NEXT signal being received at a first end 106 of the second transmission line 105 over a time period as a result of an electrical signal sent onto the first transmission line 102 from its first end 103, the obtained measurements being in the time domain. The method further comprises obtaining 208 a crosstalk coupling estimate per transmission line sub-interval $X_1$, $X_2$, $X_3$, $X_4$, $X_5$ by compensating the obtained measurements in the time domain of the received NEXT signal for round-trip attenuation of the sent signal from the first end of the first line to the sub-interval and back to the first end of the second line, and obtaining 210 an estimate of a total crosstalk coupling by adding together at least some of the obtained crosstalk coupling estimates per transmission line sub-interval.

An electrical transmission line signifies a device, line or wire over which an electrical signal can be transmitted from a first end or point of the line to a second end or point of the line. The transmission line may be a single metallic conductor, or a cable comprising two or more metallic conductors, such as a twisted pair cable. The first and the second electrical transmission line may at least partly have a parallel extension direction from their first ends to their second ends. The first and the second transmission lines are arranged with at least a part of their extensions as close to each other that crosstalk may occur from a signal sent in the first line to the second line. The transmission line sub-interval normally relates to a sub-interval of both the first and the second line, as the signal which is measured has traveled along both lines; first along the first line from its first end, then passing to the second line by crosstalk coupling, then back again along the second line to the first end of the second line. The interval we refer to may hence normally relate to both lines. The first and the second line are in a typical case arranged close to each other, e.g. in the same cable bundle. In the latter case, the sub-interval would coincide with a sub-interval of the cable bundle.

Crosstalk is a phenomenon that occurs when a signal transmitted on a first transmission line of a transmission system creates an undesired effect in a second transmission line of the system. Crosstalk is usually caused by undesired capacitive, inductive, or conductive coupling from the first transmission line to the second line. Crosstalk effects between closely lying transmission lines connected to the same node may be tested by sending a signal from the node onto the first line and detect a resulting signal received at the node on the second line, i.e. NEXT. In this context it is expected that crosstalk is symmetrical, i.e. that approximately 50% of the crosstalk signal in the second line travels in the direction away from the node and 50% of the crosstalk travels in the direction towards the node. The latter is detected. A crosstalk coupling estimate is the estimate of the crosstalk from the first transmission line to the second transmission line. A round-trip attenuation is defined as the attenuation of a signal as sent from one point of the cable to another point and back again. The round-trip attenuation of the sent signal from the first end of the first line to the sub-interval and back to the first end of the second line may be estimated to the distance from the first end of the first line through the first line to a middle point of the sub-interval and back through the second line to the first end of the second line. The obtaining of measurements of the received NEXT signal may be performed by e.g. a system measurement device connected to the first end of the second line.

The described method makes it possible to estimate far end crosstalk, FEXT from a measurement of NEXT. Consequently, no dual-ended line test needs to be performed to estimate total crosstalk coupling over a transmission line. Instead, by this method, it suffices to have a single-ended line test. Further, a communication transceiver at the first end of the second transmission line can be reused for measurement and hence it is not needed to install any dedicated test equipment. Also, there is an advantage with single ended line tests since measurements can be performed before the far-end node has been connected, or if it fails, and it is also possible to do measurements when a cable fault has occurred that is so severe that reliable two-end measurements cannot be performed. Further, by compensating for round-trip attenuation for measurements at line sub-intervals and then adding together some of the compensated sub-interval measurements, a summarized measurement can be achieved that can be easily be compared with a threshold value.

Figure 4:
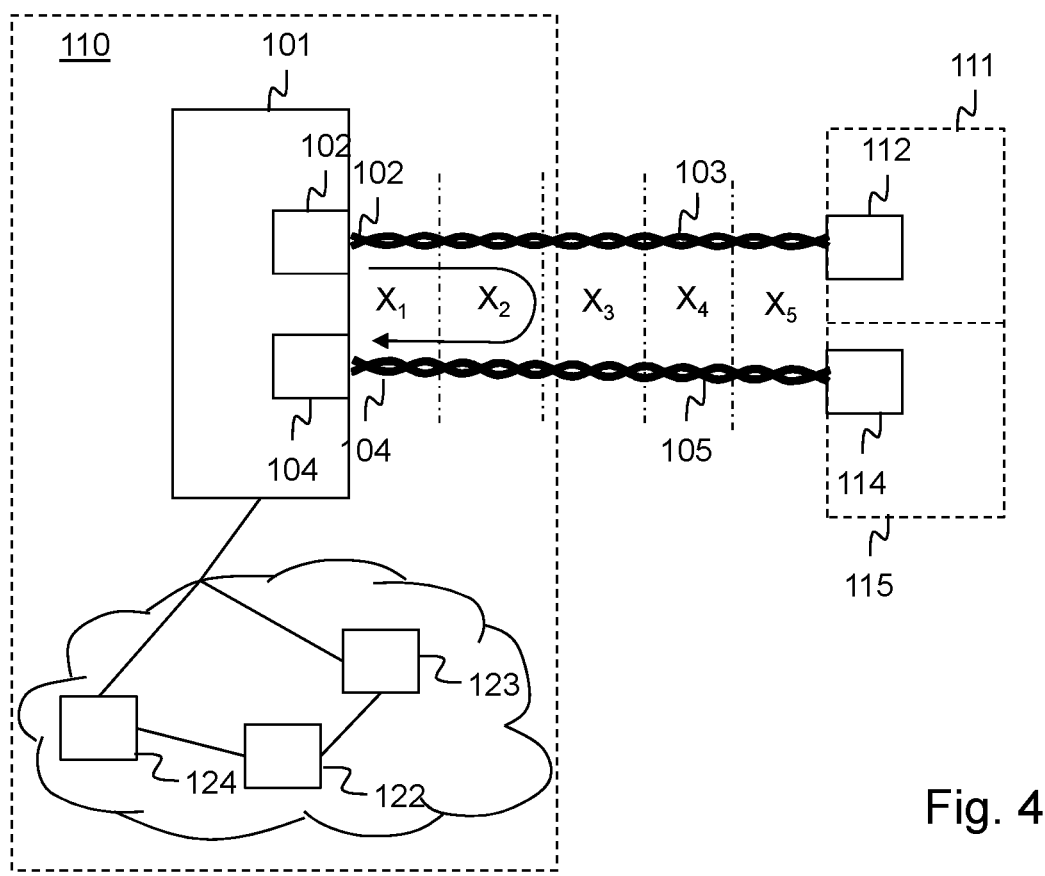
FIG. 4 is a schematic block diagram of another system according to possible embodiments.

The method may be performed anywhere in the communication system 110. The receiver 107 connected to the first end of the second line 105 is arranged to receive the NEXT signal and either the receiver itself or a separate measurement unit connected to the receiver may perform the measurements on the received NEXT signal. The system that performs the method then obtains the measurements from the receiver/measurement unit. The method may be performed e.g. by the second communication node 108, in which the receiver 107 that received the NEXT signal is situated, or by any node of the communication system directly or indirectly connected to the second communication node, such as in a baseband node, or by an operation support system, OSS, of the communication system. According to another embodiment, as shown in FIG. 4, the method may be performed by a group of network nodes 122, 123, 124 of the communication system 110, wherein functionality for performing the method are spread out over different physical, or virtual, nodes of the system. The latter may be called a "cloud"-solution.

Figure 5:
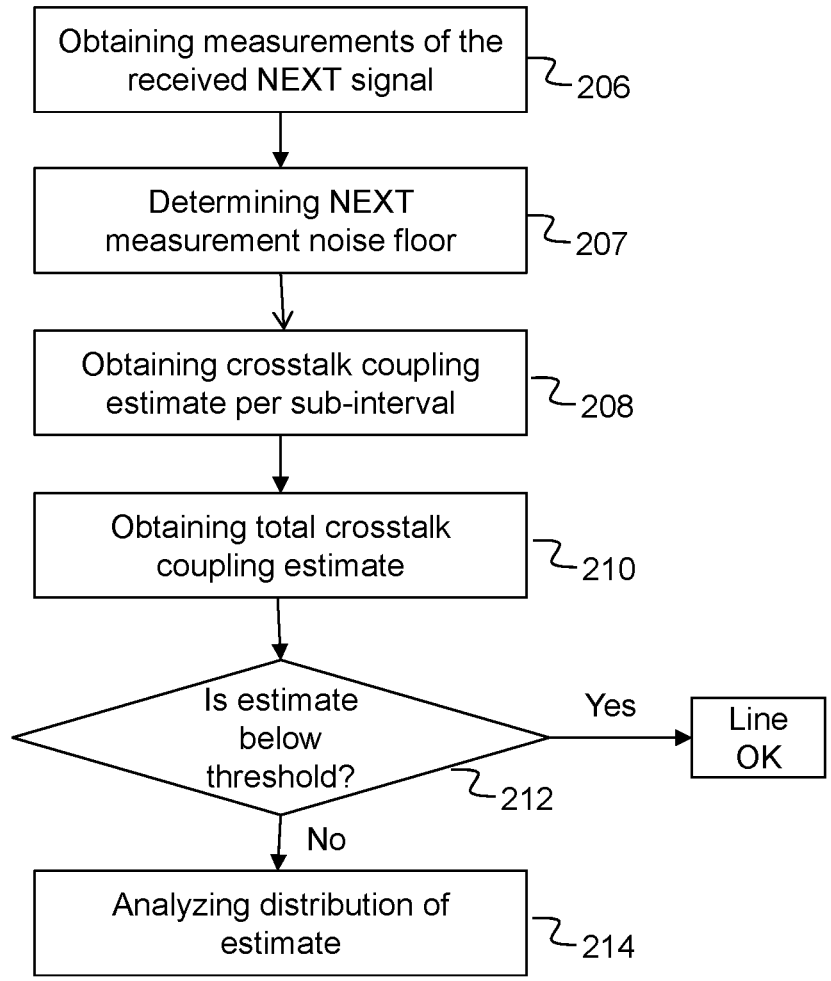
FIG. 5 is a flow chart illustrating a method performed by a system, according to further possible embodiments.

According to an embodiment as shown in FIG. 5, the method further comprises determining 212 whether the obtained estimate of total crosstalk coupling is below a threshold. The threshold may be set based on a pre-set requirement such as a system, e.g. ACRF, requirement. Hereby it is possible to determine whether performance of the first and/or second transmission line is sufficient or not, depending on if the requirement for the total crosstalk estimate is met. When the estimate is below the threshold, the transmission lines may be concluded to have an acceptable function.

According to another embodiment also shown in FIG. 5, the method further comprises analyzing 214 distribution of the estimate of total crosstalk coupling over a measurement distance of the first and/or second transmission line, when the obtained estimate is not below the threshold. The measurement distance may be a length of the transmission line comprising some or all of the sub-intervals over which the total crosstalk coupling is estimated. If the crosstalk coupling is rather evenly distributed over the measurement distance, there is probably leakage due to poor shielding or poor balance of any of the first or second transmission line.

If there is a crosstalk coupling peak at a certain location, there is probably a fault, e.g. short circuit at this location.

According to another embodiment, the crosstalk coupling estimate per transmission line sub-interval is further obtained 208 by compensating the obtained measurements in the time domain for a phase shift of the sent signal from the first end of the first line to the sub-interval and back to the first end of the second line. By such a characteristics, the measurements are compensated not only for round-trip attenuation but also for phase shift. Consequently, a more accurate estimation of crosstalk coupling can be obtained.

According to another embodiment, as shown in FIG. 5, the method further comprises determining 207 a level of NEXT measurement noise floor at the first end of the second transmission line. Then the crosstalk coupling estimate per transmission line sub-interval is obtained 208 by only compensating the obtained measurements for round-trip attenuation for the obtained measurements of NEXT signal that are at least an amount stronger than the determined NEXT measurement noise floor. By determining the noise floor and only compensating for attenuation for the obtained measurements where there is a sufficient signal to noise ratio (in other words where the NEXT signal is a set amount stronger than the determined background noise), a possible systematic fault is avoided due to wrongly increasing noise floor when compensating for round-trip attenuation.

According to an embodiment, the NEXT measurement noise floor is determined 207 by obtaining measurements from two or more in time spread NEXT signals and calculate correlation between the measurements of the two or more signals. When the obtained NEXT signals are in the same signal level as the noise floor level, the correlation will drop, and consequently the background noise level could be determined from the correlation value.

According to another embodiment, the method further comprises compensating the obtained measurements depending on a signal to noise ratio of the received NEXT signal, e.g. using a Wiener filtering based method. With such a method it is not necessary to set a threshold to determine the noise floor, thereby being less sensitive to bad user configuration.

According to another embodiment, the obtaining 206 of measurements in time domain comprises measuring the received NEXT signal in the frequency domain and transforming the measurements in the frequency domain to the time domain. Typically, a window function is used before transformation.

According to another embodiment, the obtaining 206 of measurements in time domain comprises measuring the received NEXT signal in the time domain.

According to another embodiment, the obtaining 208 of a crosstalk coupling estimate per transmission line sub-interval is performed by compensating the obtained measurements for round-trip delay and for round-trip attenuation. By compensating, i.e. detrending, the time-domain measurements of the received NEXT signal for round-trip delay and for round-trip attenuation, a more accurate estimate can be achieved. In this case, a coherent addition is performed, i.e. complex crosstalk coupling values are added, instead of an incoherent addition, i.e. an addition of power as is the case when only round-trip attenuation is compensated for. Note that the coherent addition gives a complex valued sum, i.e. phase and amplitude, while the incoherent addition gives a power value.

In the following, another embodiment will be described. Communication systems today often operate in frequency domain and the results from measurements performed with transceivers of such systems will then also be in frequency domain. OFDM systems divide the spectrum into a number of subcarriers, i.e. frequency bins, and the measurements will then typically be reported as a vector with one value per measured subcarrier. A communication device connected to at least two pairs of a cable could e.g. measure the NEXT per subcarrier, at the frequency band of the transceiver configuration, by sending a signal on its port connected to one of the pairs and receiving the signal on another of its ports connected to another pair. If the transmission and reception is synchronized, a proper calibration procedure, e.g. two-port Short, Open, Load, Through, SOLT, as used for vector network analyzers, can be applied to the measurement results and then both adequate phase and magnitude information will be available, i.e. the NEXT vector will be complexed valued.

The NEXT in frequency domain, NEXT(f), will give information on the NEXT power per subcarrier and this could be used to e.g. compare the cable with the ISO/IEC 11801 or ANSI/TIA-568-C cable specifications, or with the communication system requirements. However, as mentioned in the background, some FDD systems only put requirements on FEXT, and NEXT cannot be directly translated into FEXT. Also, the NEXT(f) does not give any information on where along the cable most leakage occur. If the cable is badly shielded and/or is poorly balanced, the leakage might be fairly evenly distributed along the cable but for decent shielded and balanced cables the leakage might be much higher in cable connectors or where there are some metallic faults.

Time information of the crosstalk can be attained by windowing and applying an inverse Fourier transform to the NEXT(f). The result of the transform will be the NEXT per delay unit where the delay is the time from measurement start. For interpretation of the results it is more convenient to have NEXT power per length unit. The NEXT per delay and the NEXT per length unit is related through the Velocity of Propagation, VoP, of the cable and it is hence straightforward to calculate the NEXT per length unit if the VoP is known. For many high quality cables, the VoP value does not vary much, so even if the VoP is not known an estimate using a default value could be done. The relative offset in the length estimation caused by a badly chosen VoP value will be equally large to the relative offset of the VoP. To avoid too large offsets it is recommended to set the default value of the VoP to the average VoP of the cables that are likely to be used.

Figure 6:
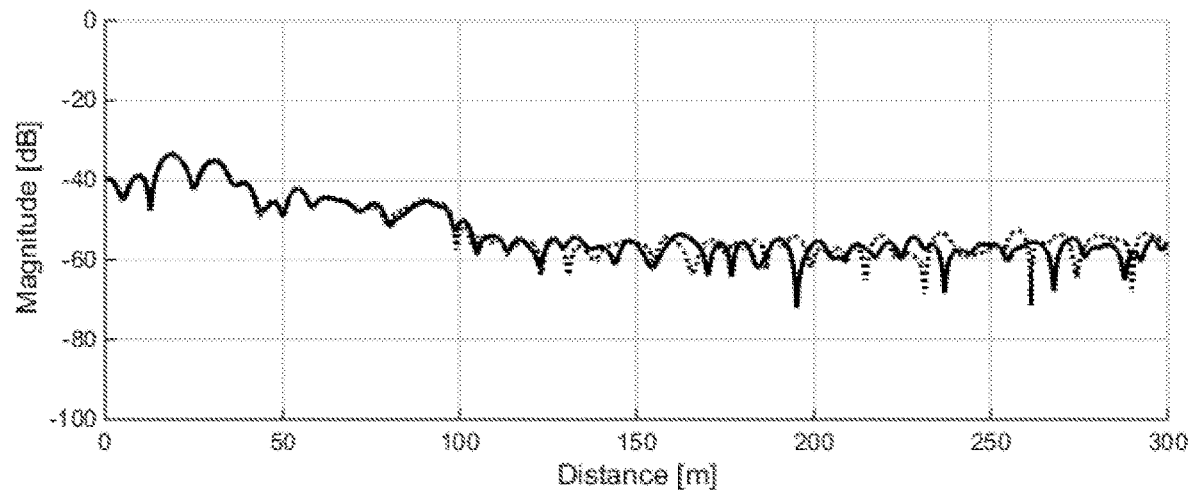
FIG. 6 is an x-y diagram of a NEXT TDT measurement.

The NEXT per length unit is referred to as a NEXT TDT. An example of a NEXT TDT is shown in FIG. 6 where the NEXT of a 100 m CAT6 Foiled Unshielded Twisted Pair, FUTP, cable with 10 m CAT6a Shielded Foiled Twisted Pair, SFTP, patch cables at both ends has been measured. As can be seen, the NEXT is distributed over the length of the cable and is affected by the cable attenuation so that NEXT from far distances are weaker (approx. −60 dB) than NEXT from short distances (approx. −40 dB). It should be noted that this is the leakage as received at the transceiver at the first end of the second line. The actual leakage per position on the cable is evenly distributed if the cable is homogenous. The example also shows that both the NEXT from a first pair to a second pair of the cable, marked with an unbroken line in FIG. 6, and from the second pair to the first pair, marked with a dotted line in FIG. 6, have been measured and the leakage is symmetrical and therefor both graphs are about the same until they reach the noise floor at approx. −60 dB.

According to a first embodiment, FEXT is estimated from the NEXT measurement, or more precisely the ACRF i.e. the FEXT compensated for attenuation. FEXT compensated for attenuation is the same as the total crosstalk power as made up of the leakage contributions from all along the cable normalized with a direct channel attenuation of the pair receiving the crosstalk.

Crosstalk is typically symmetrical so that the leakage from one point in the cable travelling towards the far end is as strong as the leakage from that same point travelling towards the near end, if attenuation effects are neglected. This means that the total ACRF will be equally strong as the total leakage from the cable as measured at the near-end i.e. the NEXT compensated for attenuation. Hence we can estimate the ACRF from NEXT if we can compensate the NEXT TDT for attenuation (and/or delay) and then calculate the sum of the compensated NEXT power over all distances.

Figure 7:
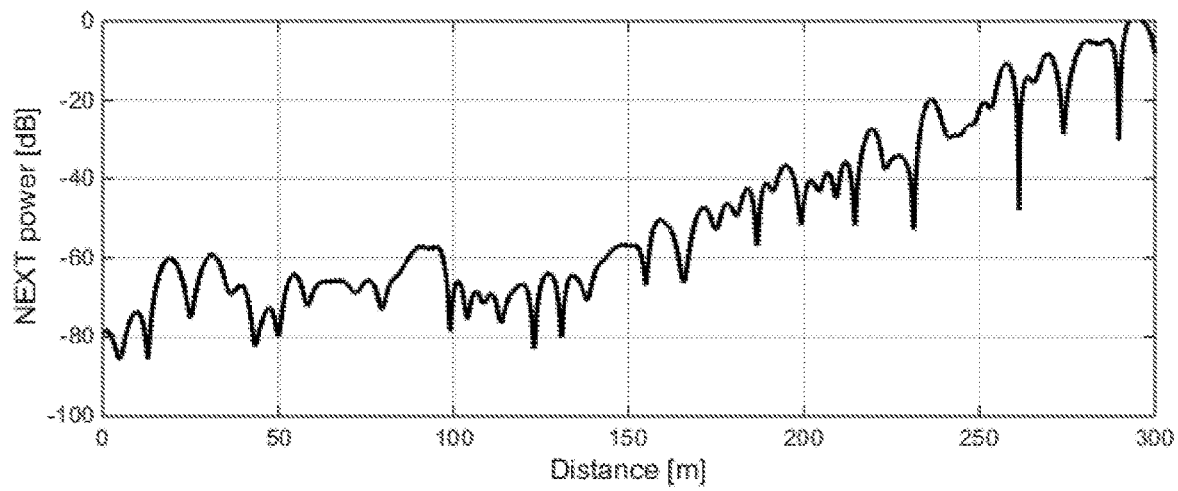
FIG. 7 is an x-y diagram of a detrended NEXT TDT where the noise floor has not been omitted when detrending.

To compensate, i.e. detrend, the NEXT TDT for attenuation, the attenuation of the cable is of course needed. This can either be retrieved from a cable model, if a fairly accurate guess of the used cable type can be made, or it can e.g. be estimated from SELT echo measurements or by other attenuation measurement or estimation methods. The method how to retrieve the attenuation is not part of this embodiment. In the examples shown a cable model has been used to get the attenuation value. When the attenuation is known one could think it is straightforward to detrend the NEXT TDT by just dividing the NEXT TDT vector with the attenuation per distance vector times two (two because for NEXT the signal travels back and forth). However, it is not since the NEXT TDT also contains a noise floor where the attenuated NEXT is not dominating and this noise floor should not be compensated for attenuation. FIG. 7 shows a NEXT TDT where attenuation compensation has been applied to the whole NEXT vector. As can be seen, the NEXT power is incorrectly increasing for the distances where the noise floor was dominating, i.e. from approx. 130 meter and longer. Hence the noise floor must be omitted from the attenuation compensation.

Several different methods can be used for omitting the noise floor from the detrending. According to an embodiment, the boundary between the signal and the noise floor is detected. This may be done in an easy way by calculating the average power at large distances where it is certain that no signal power is visible, i.e. where there is only noise floor detected. By adding a margin to the calculated average power, the value with the added margin can be used as a threshold to separate the noise floor from the signal part. This method is however quite rough and it is very sensitive to the selection of margin.

According to another embodiment, the noise floor is detected by taking several measurements, at least two, and calculate the correlation or variance/SNR between the measurements. Note that many measurement methods uses averaging and can provide the measurement variance with the measurement results. If few measurements are made the calculation can be done over a moving window. When the signal hits the noise floor, the correlation/SNR will drop. If it for some reason is not possible to repeat measurements, it is also possible to use the fact that the crosstalk is symmetrical and calculate the correlation from both directions of the NEXT, i.e. from the first line to the second line and also from the second line to the first line of FIG. 2

Figure 8:
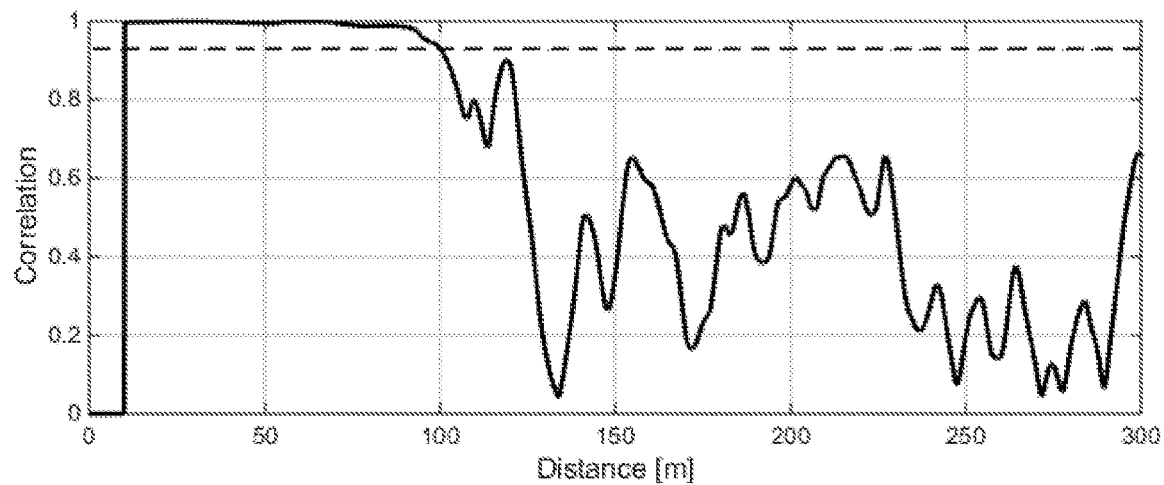
FIG. 8 is an x-y diagram showing correlation between two NEXT measurements.

The correlation or SNR may then be compared to a set threshold and it may be decided that all parts below the threshold is part of the noise floor. FIG. 8 shows the correlation and threshold, with a dashed line, for the measurements in the previous examples. As understood, the parts below the dashed line threshold are considered to have a too low correlation and therefore is considered to belong to the noise floor. Note that both the selection of window size and threshold value will affect the result.

Figure 9:
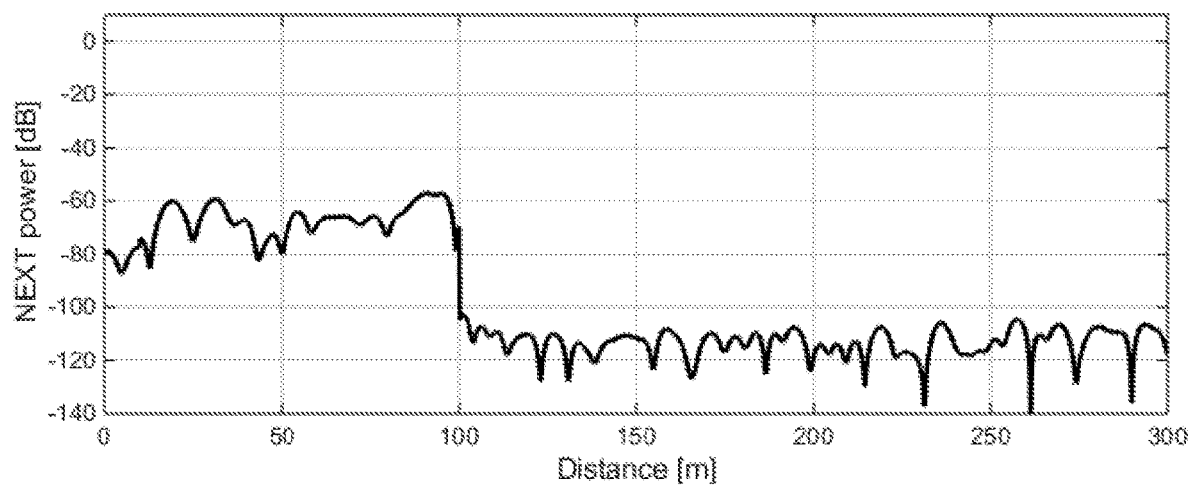
FIG. 9 is an x-y diagram of a detrended NEXT TDT when the noise floor has been omitted when detrending.

Using any of the noise floor detection and omitting embodiments as described above before compensating the measured NEXT in time domain for attenuation yields a detrending as shown in FIG. 9. As can be seen in FIG. 9, the noise floor, dominating from approx. 100 meters distance is clearly separated from the signal part, dominating at the first 100 meter cable.

Figure 10:
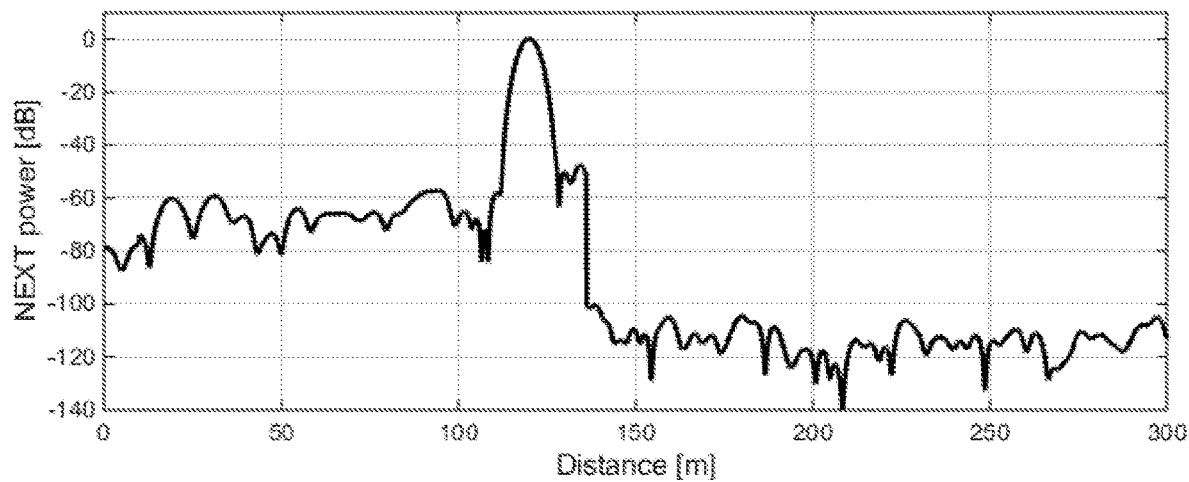
FIG. 10 is an x-y diagram of a detrended NEXT TDT of a cable that has been short-circuited between the pairs at its opposite end.

To verify the correctness of the detrending, a measurement was performed with a short circuit between the first line/pair and the second line/pair at the end of a 120 meter long cable. In theory the short circuit will cause a 100% leakage at the distance of the short circuit, i.e. a 0 dB NEXT power. As can be seen in FIG. 10, which shows the result using an embodiment of the method omitting the noise floor when compensating for attenuation, the NEXT power is close to 0 dB at around 120 m, which is the cable end and thus the detrending seems to work satisfactory.

Figure 11:
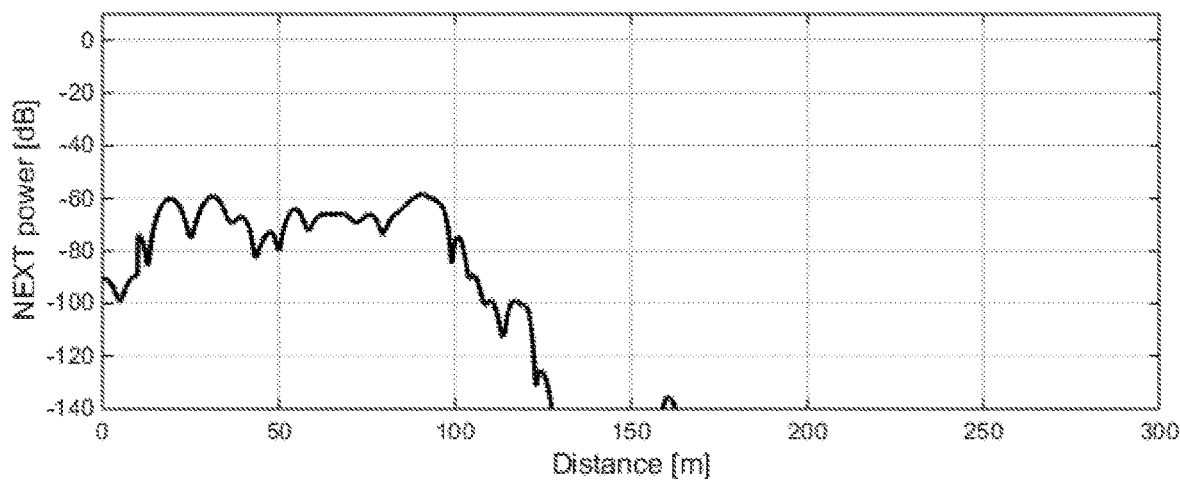
FIG. 11 is an x-y diagram of a detrended NEXT TDT using Wiener filtering on the same measurements as was used in FIG. 9.
Figure 12:
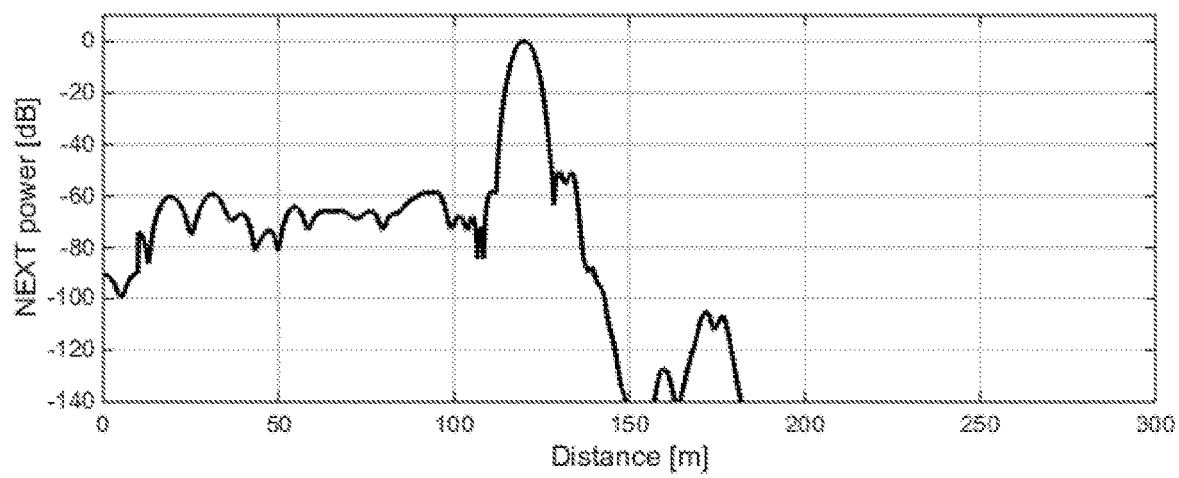
FIG. 12 is an x-y diagram of a detrended NEXT TDT using Wiener filtering for the same measurements as was used in FIG. 10.

Another method for omitting the noise floor is to use a Wiener filtering based method when compensating for attenuation, i.e. a compensation that depends on the SNR. Since the SNR is low at the noise floor, the part of the measurements that have a low SNR will get a much lower weight in the detrending. An advantage with this is that there is no need to set a threshold to determine the noise floor and thus the method is less sensitive to bad user configurations. The Wiener filtering function can be calculated as:

$$hWiener(l) = \frac{1}{h(l)} * \left( \frac{|h(l)|^x}{|h(l)|^x * \frac{x}{SNR(l) + const}} \right),$$

where h(l) is attenuation per distance and const is a compensation factor that will adjust how the TDT at lower SNR values is weighted. In the examples below a compensation factor of 10 dB has been used. FIG. 11 shows the resulting detrending using the Wiener filtering method for the same measurements as in FIG. 9. FIG. 12 shows the resulting detrending using the Wiener filtering method for the same measurements as in FIG. 10. As can be seen in FIG. 12, the short circuit once again seems to be correctly places around 0 dB at 120 m and the noise floor is weighted lower than with the noise floor detection method.

According to yet another embodiment the noise floor may be omitted by setting the noise floor to start after the total length of the cable. A pre-known cable length or an estimated length from e.g. an echo measurement can be used. Note though that the reach of a NEXT measurement is shorter than the reach for an echo measurement so there is a risk that the NEXT measurement hits the noise floor before the end of the cable.

With the detrended NEXT TDT the obtained measurement data has been manipulated to show the leakage per distance correctly. A goal now is to interpret this so that a threshold can be set to make a decision on when the leakage is too high. Of course a threshold could be set for the maximum value of the detrended TDT. However, if the leakage only is high at a few distances, the total leakage could still be so low that there is no performance problem for the system. Also such a threshold would not be directly related to system requirements and hence it is not easy to choose an appropriate threshold. Therefore, it is suggested to estimate the ACRF, which is a common parameter that often is included among the system requirements. As discussed before, the ACRF is the leakage received at the far-end side, i.e. FEXT, compensated for attenuation, i.e. the sum of all leakage contributions from each point in the cable. If the cable is symmetrical this will in theory be the same as the sum of the leakage from all distances in the detrended TDT. To get an accurate value it is however necessary to also compensate for the energy from the windowing function when calculating the sum of the TDT. Note that skew, bad VoP estimation etc. will decrease the quality of this approximation.

Calculating the total energy in the TDT for the example of FIG. 9, i.e. by calculating the sum of the TDT, gives an ACRF estimation of −57.3 dB. Measuring ACRF directly with a cable certifier gives a value of −56.7 dB. Hence the estimation in this example is only 0.6 dB off. This estimated value could then be compared to the system ACRF requirement to decide if the performance is acceptable or not.

In case the ACRF estimation shows that the requirement is not met it is very valuable to understand why the performance is too poor. More specifically, it is of importance to identify if the poor performance is because of a cable quality issue so that the cable needs to be replaced, or if it is a fault that possibly could be repaired by a technician.

A method for providing troubleshooting information can be established by looking at how the crosstalk is distributed over the measurement distance. Leakage from a poor shielding and/or poor balance should be fairly evenly distributed along the cable. Faults or problematic connectors should however have more leakage at the distance of the fault/connector. This could be understood by looking at the previous examples of FIGS. 9 and 10 where the short circuit measurements of FIG. 10 could be seen as a fault. A short circuit could for example happen with a bad connection in a patch panel.

Below two different embodiments are described to detect distributed crosstalk. However, also other statistical analysis methods might be used to detect distributed crosstalk. Both described embodiments are based on setting a threshold at a chosen level below the maximum detrended NEXT TDT value.

The first embodiment looks at how many detrended NEXT TDT samples are above the threshold. This number is divided with the number of samples that are above the threshold for the NEXT TDT window. If it is a large enough single point fault it will generate energy close to the window energy at the position of the fault, i.e. the division will be close to 1. If the crosstalk is distributed, the division will be larger than one.

The second embodiment simply looks at how many local maxima are above the threshold. If just one maximum is above the threshold it is considered to be a single point fault while several maxima above the threshold indicate a poor/missing shield or a poor balance of the cable.

Figure 13:
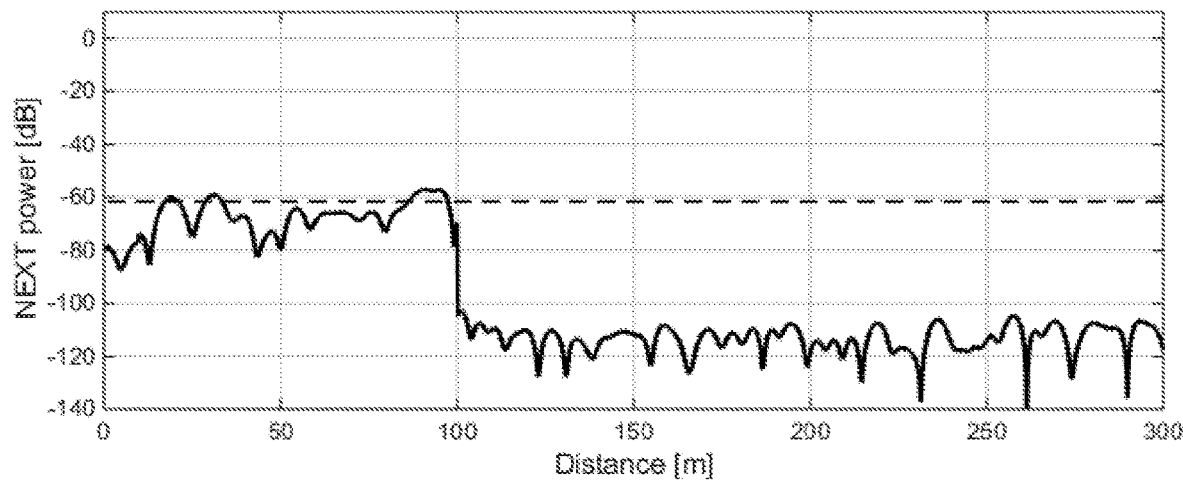
FIG. 13 is an x-y diagram of the detrended NEXT TDT of FIG. 9 with a threshold for distribution detection.
Figure 14:
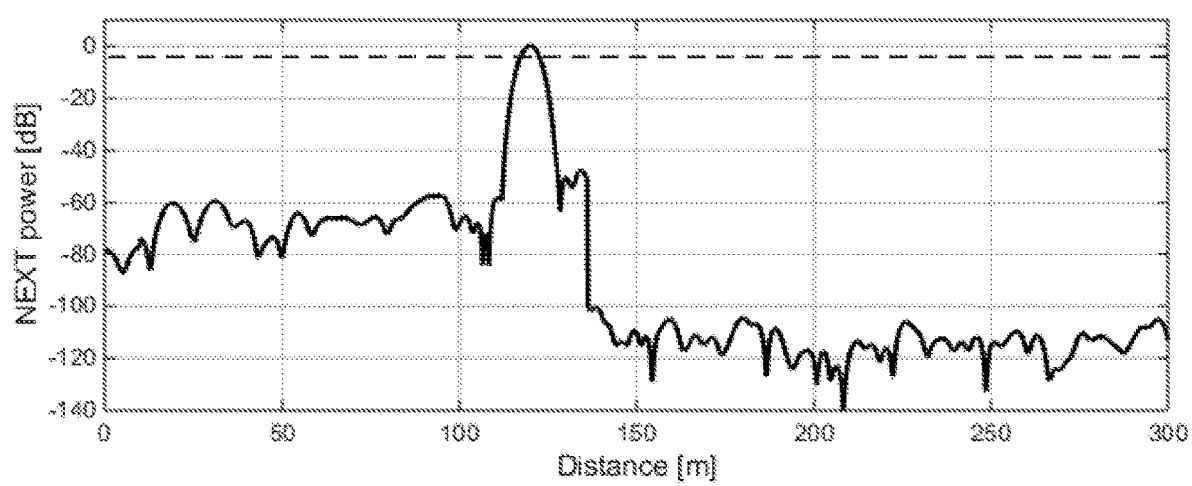
FIG. 14 is an x-y diagram of the detrended NEXT TDT of FIG. 10 with a threshold for distribution detection.

The same measurements as used in the tests shown in FIGS. 9 (with just a cable) and 10 (with a short circuit between the pairs/lines at the end of the cable) are shown compared to an inserted threshold in FIGS. 13 and 14, respectively. The threshold has here been selected to 4.5 dB below the curve maximum and is indicated in the figures by a dashed line. For the measurement shown in FIG. 13, the first detection embodiment gives a value of 3.5 thus indicating distributed crosstalk since it is clearly above 1. The second embodiment finds 2 local maxima at 18.8 and 30.9 m which also indicate distributed crosstalk. For the measurement shown in FIG. 14, the first detection embodiment gives a value of 0.96, thus indicating single point crosstalk since the value is close to one. The second algorithm finds 0 local maxima which also indicates single point crosstalk.

Figure 15:
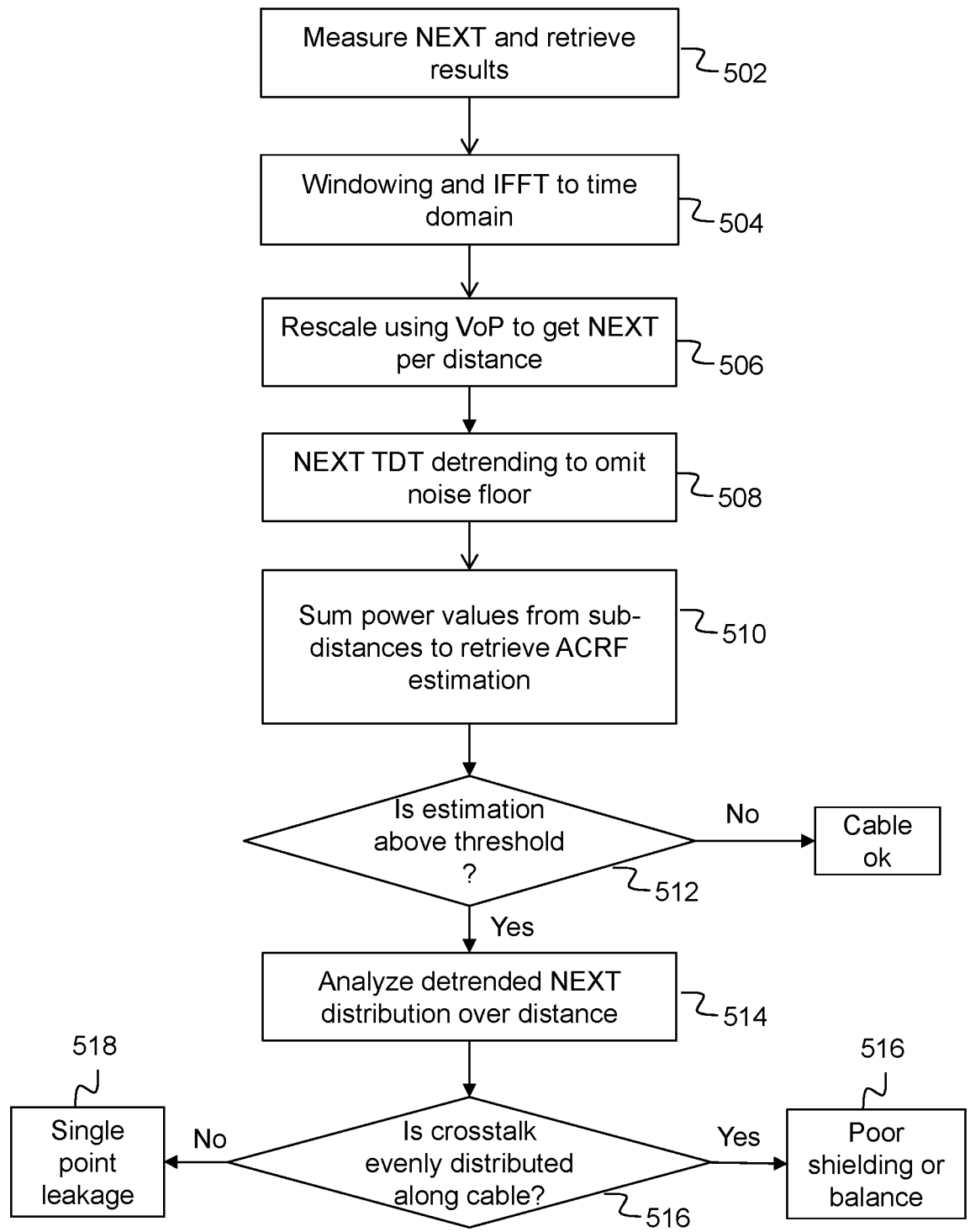
FIG. 15 is a flow chart of a method according to a possible embodiment.

FIG. 15 describes an embodiment of a method detecting crosstalk between a first and a second transmission line, such as the lines of FIG. 2, which may be part of a cable. NEXT resulting from a signal sent onto the first line 102 at its first end is measured in the frequency domain 502 at the first end of the second line 105. The measurements are then windowed and inverse fast Fourier transformed, IFFT, 504 into the time domain. Thereafter, the measurements in time domain are rescaled 506 to distance using VoP to get NEXT per sub-distance (or sub-interval) of the cable, called NEXT TDT. The NEXT TDT is then detrended, i.e. compensated for attenuation, 508 to omit the noise floor. Thereafter, the detrended NEXT TDT, i.e. NEXT power values from sub-distances are summed to retrieve an ACRF estimation. The ACRF is then compared 512 with a threshold value that may have been set according to system requirements. If the ACRF estimation is below the threshold, the cable is concluded to be ok. If the ACRF estimation is above the threshold, the detrended NEXT TDT distribution over distance is analyzed 514. If crosstalk is evenly distributed along the cable, according to the analysis, it is concluded 516 that the cable has poor shielding or balance. If crosstalk is not evenly distributed along the cable, according to the analysis, a single point of leakage is concluded 518. The conclusion of the likely fault type can then be sent to the operator's management system as an alarm so that the operator can take an appropriate action to mitigate the problem.

Figure 16:
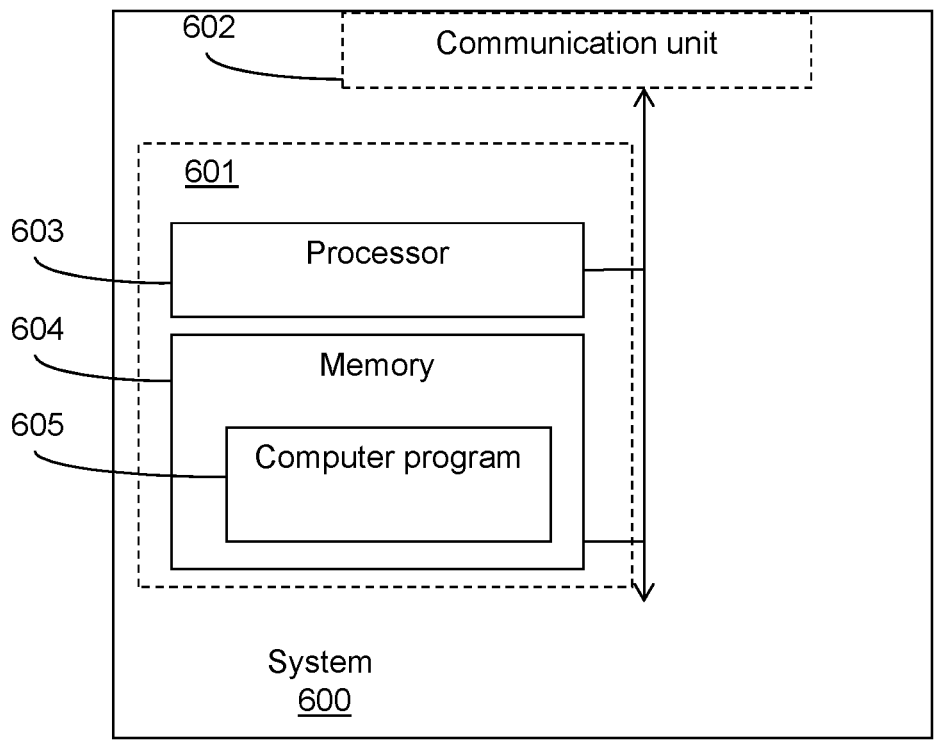
FIGS. 16-17 are schematic block diagrams of systems for estimating crosstalk according to possible embodiments.

FIG. 16, in conjunction with FIG. 2, shows an embodiment of a system 600 configured for estimating crosstalk between a first electrical transmission line 102 and a second electrical transmission line 105. The system comprises a processor 603 and a memory 604. The memory contains instructions executable by said processor, whereby the system 600 is operative for obtaining measurements of a received near end crosstalk, NEXT, signal, the NEXT signal being received at a first end 106 of the second transmission line 105 over a time period as a result of an electrical signal sent onto the first transmission line 102 from its first end 103, the obtained measurements being in the time domain. The system 600 is further operative for obtaining a crosstalk coupling estimate per transmission line sub-interval ($X_1$, $X_2$, $X_3$, $X_4$, $X_5$) by compensating the obtained measurements in the time domain of the received NEXT signal for round-trip attenuation of the sent signal from the first end of the first line to the sub-interval and back to the first end of the second line, and obtaining an estimate of a total crosstalk coupling by adding together at least some of the obtained crosstalk coupling estimates per transmission line sub-interval. The system 600 may also be called a crosstalk estimation system.

The receiver 107 connected to the first end of the second line 105 is arranged to receive the NEXT signal and either the receiver itself or a separate measurement unit connected to the receiver may perform the measurements on the received NEXT signal. The system then obtains the measurements from the receiver/measurement unit. The system 600 may be the second communication node 108, in which the receiver 107 that received the NEXT signal is situated, or the system may be any node of the communication system 110 directly or indirectly connected to the second communication node, such as in a baseband node, or in an operation support system, OSS, node of the communication system. According to another embodiment, as shown in FIG. 4, the system may be a group of network nodes 122, 123, 124 of the communication system 110, wherein system 600 functionality are spread out over different physical, or virtual, network nodes 122, 123, 124. The latter may be called a "cloud"-solution.

According to an embodiment, the system 600 is further operative for determining whether the obtained estimate of total crosstalk coupling is below a threshold.

According to another embodiment, the system is operative for analysing distribution of the estimate of total crosstalk coupling over a measurement distance of the first and/or second transmission line, when the obtained estimate is not below the threshold.

According to another embodiment, the system is operative for obtaining the crosstalk coupling estimate per transmission line sub-interval by compensating the obtained measurements in the time domain for a phase shift of the sent signal from the first end of the first line to the sub-interval and back to the first end of the second line.

According to another embodiment, the system is further operative for determining a level of NEXT measurement noise floor at the first end of the second transmission line, and for obtaining the crosstalk coupling estimate per transmission line sub-interval by only compensating the obtained measurements for round-trip attenuation for the obtained measurements of NEXT signal that are at least an amount stronger than the determined NEXT measurement noise floor.

According to another embodiment, the system is operative for determining the NEXT measurement noise floor by obtaining measurements of two or more in time spread NEXT signals and calculate correlation between the measurements of the two or more signals.

According to another embodiment, the system is further operative for compensating the obtained measurements depending on a signal to noise ratio of the received NEXT signal, e.g. using a Wiener filtering based method.

According to another embodiment, the system is further operative for obtaining the measurements in time domain by measuring the received NEXT signal in the frequency domain and transforming the measurements in the frequency domain to the time domain.

According to another embodiment, the system is operative for obtaining the crosstalk coupling estimate per transmission line sub-interval by compensating the obtained measurements for round-trip delay and for round-trip attenuation.

According to other embodiments, the system 600 may further comprise a communication unit 602, which may be considered to comprise conventional means for communicating from/to the system 600 to/from other nodes in the communication system 110. The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in the system 600 causes the system to perform the steps described in any of the described embodiments of the system. The computer program 605 may be carried by a computer program product connectable to the processor 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication system 110 to which the system 600 has access via the communication unit 602. The computer program may then be downloaded from the server into the memory 604.

Figure 17:
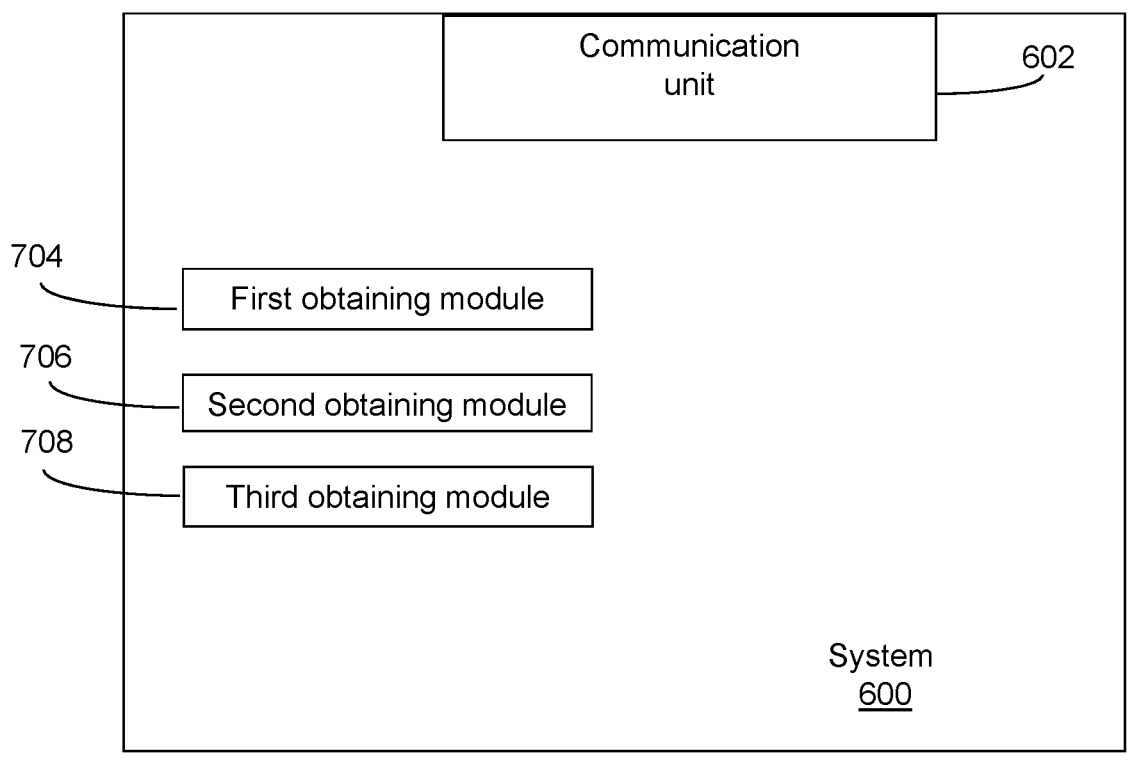

FIG. 17, in conjunction with FIG. 2, describes another embodiment of a system 600 configured for estimating crosstalk between a first electrical transmission line 102 and a second electrical transmission line 105. The system 600 comprises a first obtaining module 704 for obtaining measurements of a received near end crosstalk, NEXT, signal, the NEXT signal being received at a first end 106 of the second transmission line 105 over a time period as a result of an electrical signal sent onto the first transmission line 102 from its first end 103, the obtained measurements being in the time domain. The system 600 further comprises a second obtaining module 706 for obtaining a crosstalk coupling estimate per transmission line sub-interval, $X_1$, $X_2$, $X_3$, $X_4$, $X_5$, by compensating the obtained measurements in the time domain of the received NEXT signal for round-trip attenuation of the sent signal from the first end of the first line to the sub-interval and back to the first end of the second line. The system further comprises a third obtaining module 708 for obtaining an estimate of a total crosstalk coupling by adding together at least some of the obtained crosstalk coupling estimates per transmission line sub-interval. The system 600 may further comprise a communication unit 602 similar to the communication unit of FIG. 16.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally means that what is within the broken line is an optional feature.

The invention claimed is:

1. A method performed by a system for estimating crosstalk between a first electrical transmission line and a second electrical transmission line, the method comprising:
    obtaining measurements of a received near end crosstalk (NEXT) signal, the NEXT signal being received at a first end of the second transmission line over a time period as a result of an electrical signal sent onto the first transmission line from its first end, the obtained measurements being in a time domain;
    obtaining a crosstalk coupling estimate per transmission line sub-interval by compensating the obtained measurements in the time domain of the received NEXT signal for round-trip attenuation of the sent signal from the first end of the first line to the sub-interval and back to the first end of the second line; and obtaining an estimate of a total crosstalk coupling by adding together at least some of the obtained crosstalk coupling estimates per transmission line sub-interval.

2. The method according to claim 1, further comprising: determining whether the obtained estimate of total crosstalk coupling is below a threshold.

3. The method according to claim 2, wherein when the obtained estimate is not below the threshold, analysing distribution of the estimate of total crosstalk coupling over a measurement distance of the first and/or second transmission line.

4. The method according to claim 1, wherein the crosstalk coupling estimate per transmission line sub-interval is further obtained by compensating the obtained measurements in the time domain for a phase shift of the sent signal from the first end of the first line to the sub-interval and back to the first end of the second line.

5. The method according to claim 1, further comprising determining a level of NEXT measurement noise floor at the first end of the second transmission line, and wherein the crosstalk coupling estimate per transmission line sub-interval is obtained by only compensating the obtained measurements for round-trip attenuation for the obtained measurements of NEXT signal that are at least an amount stronger than the determined NEXT measurement noise floor.

6. The method according to claim 5, wherein the NEXT measurement noise floor is determined by obtaining measurements of two or more in time spread NEXT signals and calculate correlation between the measurements of the two or more signals.

7. The method according to claim 1, further comprising compensating the obtained measurements depending on a signal to noise ratio of the received NEXT signal, e.g. using a Wiener filtering based method.

8. The method according to claim 1, wherein the obtaining of measurements in time domain comprises measuring the received NEXT signal in the frequency domain and transforming the measurements in the frequency domain to the time domain.

9. The method according to claim 1, wherein the obtaining of measurements in time domain comprises measuring the received NEXT signal in the time domain.

10. The method according to claim 1, wherein the obtaining of a crosstalk coupling estimate per transmission line sub-interval is performed by compensating the obtained measurements for round-trip delay and for round-trip attenuation.

11. A system configured for estimating crosstalk between a first electrical transmission line and a second electrical transmission line, the system comprising a processor and a memory, said memory containing instructions executable by said processor, whereby the system is operative for:

obtaining measurements of a received near end crosstalk (NEXT) signal, the NEXT signal being received at a first end of the second transmission line over a time period as a result of an electrical signal sent onto the first transmission line from its first end, the obtained measurements being in a time domain;

obtaining a crosstalk coupling estimate per transmission line sub-interval by compensating the obtained measurements in the time domain of the received NEXT signal for round-trip attenuation of the sent signal from the first end of the first line to the sub-interval and back to the first end of the second line, and obtaining an estimate of a total crosstalk coupling by adding together at least some of the obtained crosstalk coupling estimates per transmission line sub-interval.

12. The system according to claim 11, further being operative for determining whether the obtained estimate of total crosstalk coupling is below a threshold.

13. The system according to claim 12, wherein when the obtained estimate is not below the threshold, the system is operative for analysing distribution of the estimate of total crosstalk coupling over a measurement distance of the first and/or second transmission line.

14. The system according to claim 11, operative for obtaining the crosstalk coupling estimate per transmission line sub-interval by compensating the obtained measurements in the time domain for a phase shift of the sent signal from the first end of the first line to the sub-interval and back to the first end of the second line.

15. The system according to claim 11, further being operative for determining a level of NEXT measurement noise floor at the first end of the second transmission line, and for obtaining the crosstalk coupling estimate per transmission line sub-interval by only compensating the obtained measurements for round-trip attenuation for the obtained measurements of NEXT signal that are at least an amount stronger than the determined NEXT measurement noise floor.

16. The system according to claim 15, operative for determining the NEXT measurement noise floor by obtaining measurements of two or more in time spread NEXT signals and calculate correlation between the measurements of the two or more signals.

17. The system according to claim 11, further being operative for compensating the obtained measurements depending on a signal to noise ratio of the received NEXT signal, e.g. using a Wiener filtering based method.

18. The system according to claim 11, operative for obtaining the measurements in time domain by measuring the received NEXT signal in the frequency domain and transforming the measurements in the frequency domain to the time domain.

19. The system according to claim 11, operative for obtaining the crosstalk coupling estimate per transmission line sub-interval by compensating the obtained measurements for round-trip delay and for round-trip attenuation.

20. A non-transitory computer readable storage medium storing one or more instructions to be run in a system, for estimating crosstalk between a first electrical transmission line and a second electrical transmission line, which the one or more instructions when run in the system causes the system to perform the following steps:

obtaining measurements of a received near end crosstalk (NEXT) signal, the NEXT signal being received at a first end of the second transmission line over a time period as a result of an electrical signal sent onto the first transmission line from its first end, the obtained measurements being in a time domain;

obtaining a crosstalk coupling estimate per transmission line sub-interval by compensating the obtained measurements in the time domain of the received NEXT signal for round-trip attenuation of the sent signal from the first end of the first line to the sub-interval and back to the first end of the second line, and obtaining an estimate of a total crosstalk coupling by adding together at least some of the obtained crosstalk coupling estimates per transmission line sub-interval.

21. A system configured for estimating crosstalk between a first electrical transmission line and a second electrical transmission line, the system comprising:
- a first obtaining module for obtaining measurements of a received near end crosstalk (NEXT) signal, the NEXT signal being received at a first end of the second transmission line over a time period as a result of an electrical signal sent onto the first transmission line from its first end, the obtained measurements being in a time domain;
- a second obtaining module for obtaining a crosstalk coupling estimate per transmission line sub-interval by compensating the obtained measurements in the time domain of the received NEXT signal for round-trip attenuation of the sent signal from the first end of the first line to the sub-interval and back to the first end of the second line, and
- a third obtaining module for obtaining an estimate of a total crosstalk coupling by adding together at least some of the obtained crosstalk coupling estimates per transmission line sub-interval.

* * * * *